United States Patent [19]

Hales

[11] 4,438,295

[45] Mar. 20, 1984

[54] REMOTE TEMPERATURE CONTROL ACTIVATION APPARATUS

[76] Inventor: Paul D. Hales, P. O. Box 7573, High Point, N.C. 27264

[21] Appl. No.: 383,538

[22] Filed: Jun. 1, 1982

[51] Int. Cl.$^3$ .......................................... H04M 11/00
[52] U.S. Cl. .................................................... 179/2 A
[58] Field of Search ................... 179/2 A, 2 AM, 2 B, 179/6.16, 84 SS

[56] References Cited

U.S. PATENT DOCUMENTS

| | | | |
|---|---|---|---|
| 3,049,592 | 8/1962 | Waldman | 179/2 A |
| 3,324,245 | 6/1967 | Stenhammar | 179/2 A |
| 3,548,102 | 12/1970 | Schaum et al. | 179/2 |
| 4,232,195 | 11/1980 | Bartelink | 179/2 A |
| 4,353,502 | 10/1982 | Myers | 179/2 A X |

Primary Examiner—A. D. Pellinen
Assistant Examiner—W. J. Brady

[57] ABSTRACT

The invention presented herein comprises apparatus and method for remote activation of heating and cooling systems in homes or other buildings. A user may wish to turn the heat on before returning home after a day in a distant office and by simply dialing the telephone at his office and allowing it to ring at his home a prescribed number of times a thermostatic regulated furnace may be turned on and his house is warmed to the desired temperature before his arrival. The invention may be used for heating or air conditioning systems and can be effectively activated wherever telephone lines are available.

12 Claims, 2 Drawing Figures

REMOTE TEMPERATURE CONTROL ACTIVATION APPARATUS

BACKGROUND AND OBJECTIVES OF THE INVENTION

Home and building owners have often had to deal with the uncomfortableness of entering a building which has stood uninhabited for a period of time which has assumed the temperature of the outdoors. During cold winter months home owners who are often away for many weeks require, upon returning, several hours to bring the temperature within the home up to a comfortable level. Owners of beach property often face a similar dilemna in that they may have to drive several hours to the beach and upon arriving are faced with stifling temperatures which may require several hours of conditioning to reduce them to acceptable levels. Thus, a large part of a weekend vacation may be in effect lost by waiting for the inside environment of the vacation home to reach a suitable temperature range.

Various timing devices have been employed in the past to turn on and off heating and cooling systems at prescribed times in anticipation of the needs of future occupants. However, there still exists a need for apparatus and a method to activate and economically control the heating and cooling systems of a building from a remote location when and if desired to convenience future occupants.

With this background in mind the present invention was developed and one of the objectives is to provide a remote building temperature influencing system activation device and method.

It is another objective of the present invention to provide remote activation temperature control apparatus which is both simple to use and economical to manufacture and install.

It is still another objective of the present invention to provide apparatus and method as described above which will allow activation from any number of remote locations.

It is also an objective of the present invention to provide apparatus and method as described above which will not be inadvertantly operated and will be simple and economical to use.

It is yet still another objective of the present invention to provide apparatus and method as described above in which the activation signal can be varied as required for a particular location.

SUMMARY OF THE INVENTION

The present invention provides for remote activation of the heating or cooling system of a building and method for accomplishing the remote activation. The apparatus includes a code receiving means and a signal transmitting means which may be a conventional telephone. By simply dialing a telephone the code is thereby inserted causing a second remote telephone means to ring or otherwise demonstrate that a signal is being received. The activation temperature control apparatus may be used to activate upon receiving 30 "rings" or more or less "rings" as required. For use in the present invention the second telephone means is modified so that it will not ordinarily ring but instead will receive the incoming signal and communicate it to a signal analyzing means. Signal analyzing means includes a thermostatic switch means which, when opened as a result of the reception of a predetermined number of "rings" allows current to be fed to a timer set for a preselected cycle and the timer allows a relay means to feed current to a temperature influencing means which may consist of conventional heating and cooling systems. The temperature influencing means may include indoor and outdoor thermostat means with control of the power supply and selection for and operation of either of heating or cooling means or may have only an inside thermostat means. If desired, outside thermostat means may control whether the heating or air conditioning unit will be operated and the inside thermostatic means would then determine whether or not the selected means (heating or cooling) is to operate as with conventional thermostat control means. The timing means as mentioned above which signals the relay means is preset for a desired heating or cooling cycle which may be for example two hours, After the two hour period has expired the reactivation of the system is necessary for the temperature influencing means to operate.

DESCRIPTION OF THE PREFERRED EMBODIMENT

In the preferred apparatus of the invention a telephone is conventionally dialed from a remote location which causes a second telephone means to "ring". (Ring as used herein means reacting to the incoming signal but not necessarily the sounding of an audible alarm.) The second telephone means transmits a signal corresponding to each "ring" to a signal analyzing means which consists of a wire wound resisting means and a thermostatic switch means. As the resisting means receives signals from the telephone means for each "ring" the resisting means becomes hotter and upon reaching a predetermined temperature according to a preselected number of "rings" transmits a signal to the thermostat switch means. The thermostat switch means then transmits a first signal to a telephone disconnect means which in turn effectively disconnects or "hangs up" the second telephone means and prevents further "ringing". Simultaneously a second signal is directed from the first thermostat switch means to a timing means for activation of a preselected duration. The timing means may be programmed for an operation of for example, two hours after which the second telephone means would then have to receive a new series of signals (from a first telephone means) for the remote temperature control activation apparatus to operate. The timing means, during its cycle signals a relay means which in turn directs a signal to a temperature influencing means. Temperature influencing means consists of conventional heating and air conditioning devices which are normally thermostatically controlled. Thermostatic controls for the temperature influencing system include both outside thermostatic means which measures the outside temperature and determines whether the inside environment should be heated or cooled. Inside thermostatic means is also connected to the temperature influencing means which conventionally regulates the operation of the heating or cooling means. Manual off and on switches are also included in the preferred form of the apparatus.

In the preferred method of the invention a code in the form of a telephone number is inserted into a remote conventional first telephone causing a signal to be sent along a path to a selected second telephone means of the activation apparatus causing the second telephone means to "ring". The phone is allowed to ring at least a preselected number of times, such as thirty (30). A signal analyzing means acknowledges that the second telephone is "ringing" and after sufficient "ringing" has occured, the analyzing means then directs a signal to a timing means which operates for a prescribed cycle or time. The timing means communicates with temperature influencing means which is thermostatically controlled which, through outside thermostatic means orders into operation either the heating or a cooling means as appropriate. The heating or cooling means is subsequently controlled by an inside thermostatic means which conventionally operates within prescribed limits to supply either heat or cooling to the building or other structure during the cycle of the timing means. When the cycle of the timing means expires the temperature influencing means discontinues operation until reactivated.

DESCRIPTION OF THE DRAWINGS

Turning now to the drawings.

Figure 1:
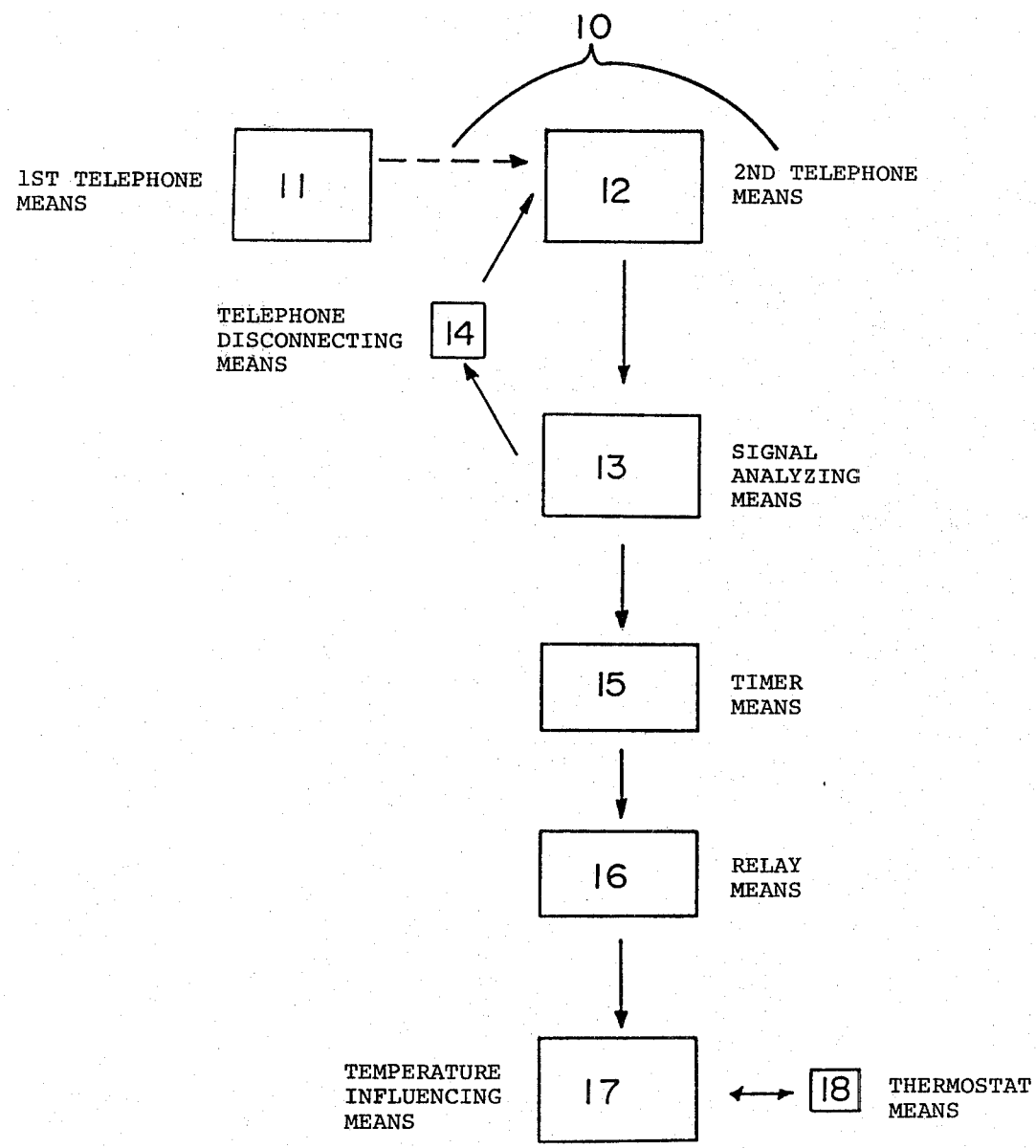
FIG. 1 demonstrates a schematic view in block fashion of one embodiment of the invention.

For a general description of the invention, FIG. 1 demonstrates in block fashion remote temperature control activation apparatus 10 communicating with first telephone means 11 which may be a conventional telephone as would have code receiving and signal transmitting means. A second telephone means 12 is also shown in FIG. 1 having a signal receiving or bell transformer means. A signal analyzing means 13 is also shown comprising a first wire wound resisting means and a first thermostatic switch means. Signal analyzing means 13 communicates with telephone disconnecting means 14 which "hangs up" after a selected delay of approximately forty-five (45) seconds as desired. Telephone means 12 and analyzing means 13 also communicates with timer means 15. As it would be understood telephone means 12 does not audibly ring but its bell transformer means does generate a signal for reception and it is desirable to have telephone means 18 to "ring" twenty (20) or more times to prevent a wrong call from inadvertantly activating apparatus 10.

Timing means 15 is an adjustable timing device which can be set for desired time cycles. Thus, timing means 15 may be set for a two hour time span when activated in which the temperature influencing means 17 (heating or cooling apparatus) thereby activated would turn off after said time span whether the heating or cooling system continually or intermittantly ran, or did not run during said time span. Timing means 15 effectively delivers a signal to relay means 16 which in turn allows current to flow to operate temperature influencing means 17. As it would be understood by those skilled in the art temperature influencing means 17 is controlled by thermostat means 18 which is preset for a comfortable temperature range such as would occur when set to 68° F.

Figure 2:
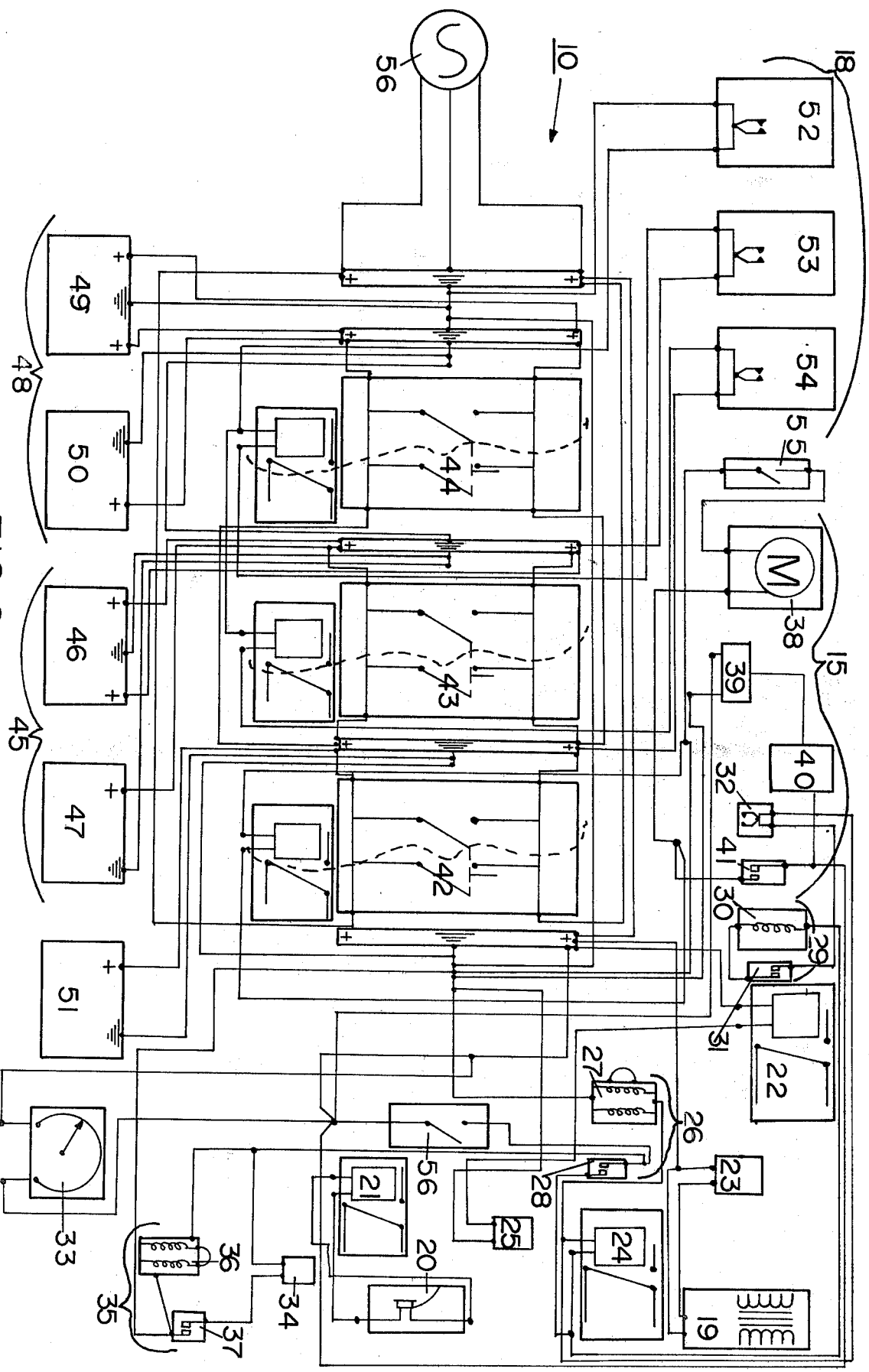
FIG. 2 demonstrates more complete schematic details of the invention.

For a more complete explanation of the invention in detail, FIG. 2 demonstrates remote temperature control activation apparatus 10 which includes bell transformer means 19 of second telephone means 12. Bell transformer means 19, upon "ringing" directs a signal to analyzing means 13 which comprises thermostat means 26 with resisting means 27 and switch means 28. Resisting means 27 when sufficiently heated through the reception of a sufficient number of rings such as 30 or more or less as desired and preset by adjusting rotary adjusting means 33, causes thermostatic switch means 28 to open. Also comprising signal analyzing means 13 is relay means 22 with relay coil 23 which operates from transformer means 19 and delivers AC current to resisting means 27. Relay means 28 with relay coil 25 communicates with resisting means 27 and feeds current to resisting means 27. Resisting means 27 may have a pair of wire wound resistors of 100 ohm each rated at 5 watts each.

Analyzing means 13 also includes thermostat means 32 which is a room thermostat which allows current to flow to resisting means 30 to insure a constant temperature of thermostat means 26 to prevent inconsistant actions due to a very low or very high room temperature during cold winter months or hot summer months if apparatus 10 were unused for long periods of time. Rotary adjusting means 33 may be for example a sensitive rheostat or ring adjusting means having a series of resistors, which when set, determines the number of "rings" required to activate apparatus 10. Thermostat means 29 comprises resisting means 30 which may be a pair of wire wound 3k resistors rated at 25 watts and switch means 31. Analyzing means 13 directs a signal to telephone disconnecting means 14 which comprises relay coil 34 which operates relay means 21 for "answering" telephone means 12, and thermostat means 35 having resisting means 36 and switch means 37. Resisting means 36, when sufficiently heated causes second thermostatic switch means 37 to open. Open switch means 37 breaks a circuit to relay means 21 and effectively "hangs up" telephone means 12. When resisting means 26 cools, thermostatic switch means 37 returns to a closed position and telephone means 12 is ready again as shown in FIG. 2 to accept incoming signals.

Thermostatic switch means 28 as shown in FIG. 2 allows a signal to be directed to timing means 15. Timing means 15 can be preset for a desired time cycle which may be for example, two hours. During said two hour time period temperature influencing means 17 may be operated and at the end of the two hour cycle timing means 15 then shuts off. Thus, should the user call for heating or cooling and later, due to some unforeseeable circumstance not to be able to reach and occupy the remote building structure, then timing means 15 will automatically shut off at the end of the prescribed time cycle and the user will not have to be concerned with having to shut the temperature influencing means 17 off or be concerned that it is running without need. Timing means 15 includes timing motor means 38, solenoid 39, camming means 40 and switch means 41. Motor means 38 drives camming means 40 for a preset time cycle which allows 230 volt AC current to relay means 42.

Also shown is switch means 55 may be manually or automatically operated and when switch means 55 is open, then operation of the temperature influencing means 17 is manual and for standard automatic operation switch means 55 is left closed. Relay means 42 is a double pole 30 amp time relay means which furnishes 230 volt AC or 115 volt AC current to double pole 30 amp relay means 43 and 44. Relay means 43 furnishes 230 volt AC current to heating means 46 or 115 volt AC current to heating means 47 as desired. Similarly, relay means 44 furnishes either 115 AC current to cooling means 50 or 230 volt AC current to cooling means 49 as required.

Temperature influencing means 17 comprises heating means 45 and cooling means 48. Heating means 45 may consist of an oil furnace with a hot water circulation system or may be an electric resistance heating system or any combination. As shown in FIG. 2 either 115 volt AC current or 230 volt AC current can be supplied as desired from relay means 43. Likewise relay means 44 allows 230 volt AC or 115 volt AC current to cooling means 48 which may comprise one or more conventional air conditioning systems or units as needed. AC current is supplied from AC supply source 56 as shown.

Manual start means 57 is also shown in FIG. 2 which allows the user to activate apparatus 10 from its location if desired.

In one embodiment of the invention as shown in FIG. 2. outside thermostat means 53 and 54 are employed which govern whether heating means 45 or cooling means 48 will operate. Inside thermostat means 52, as previously mentioned controls the selected heating or cooling temperature ranges and dominates both outside thermostat means.

As would be understood timing means 18 operates from a preset time frame which may be for example two hours, or less as required and is driven by a motor means 34. Thus, as explained above the operation of apparatus is quite simple and can be operated from any variety of remote locations simply by dialing the telephone number of the line joining apparatus 10 and allowing it to ring the number of times required for activation as predetermined.

Various modifications and ranges and specification changes can be made to the apparatus and methods as set forth herein for particular requirements and the examples and illustrations as shown herein are not intended to limit the scope of the invention.

I claim:

1. Apparatus for remote temperature control activation of a structure comprising: a remote code receiving means, a signal transmitting means, said signal transmitting means communicating with said code receiving means, a signal receiving means, said signal receiving means distant from and communicating with said signal transmitting means, signal analyzing means, said signal analyzing means communicating with said signal receiving means, said signal analyzing means including resisting means and thermostatic switch means, said resisting means communicating with said thermostatic switch means, said resisting means being preset to activate said thermostatic switch means upon receiving a predetermined large plurality of signals, each signal corresponding to a conventional telephone ring from a single telephone call, and temperature influencing means, said temperature influencing means communicating with said signal analyzing means whereby said temperature influencing means is activated by said code receiving means.

2. Apparatus for remote temperature control activation as claimed in claim 1 wherein said code receiving means comprises telephone means.

3. Apparatus for remote telephone control activation as claimed in claim 1 wherein said code receiving means and signal transmitting means comprises telephone means.

4. Apparatus for remote telephone control activation as claimed in claim 1 wherein said signal receiving means comprises telephone means.

5. Apparatus for remote temperature control activation as claimed in claim 1 wherein said signal analyzing means includes adjustable, heat reactive resisting means.

6. Apparatus for remote temperature control activation as claimed in claim 1 and having a timing means, said timing means communicating with signal analyzing means.

7. Apparatus for remote temperature control activation as claimed in claim 1 wherein said temperature influencing means comprises heating means.

8. Apparatus for remote temperature control activation as claimed in claim 1 wherein said temperature influencing means comprises cooling means.

9. Apparatus for remote temperature control activation as claimed in claim 1 and including relay means said relay means communicating with said temperature influencing means.

10. Apparatus for remote temperature control activation as claimed in claim 1 wherein said temperature influencing system includes heating and cooling means.

11. Apparatus for remote temperature control activation of structure comprising: first telephone means, a distant second telephone means, said first telephone means communicating with said distant second telephone means, signal analyzing means, said signal analyzing means communicating with said second telephone means, said signal analyzing means including resisting means communicating with a thermostatic switch means, said resisting means being preset to activate said thermostatic switch means upon receiving a predetermined large plurality of signals, each signal corresponding to a conventional telephone ring from a single telephone call, telephone disconnect means, said telephone disconnect means communicating with said second telephone means and with said signal analyzing means, said telephone disconnect means having a coil means and a thermostat means, said thermostat means including a resisting means and a switch means, timing means, said timing means communicating with said signal analyzing means, relay means, said relay means communicating with said timing means, temperature influencing means, said temperature influencing means including heating and cooling means, said heating and cooling means communicating with said relay means, thermostat means, said thermostat means communicating with said temperature influencing means whereby said temperature influencing means is activated by said first telephone means.

12. Apparatus for remote temperature control activation of a structure as claimed in claim 11 wherein said timing means comprises a motor means, a camming means, said camming means attached to said motor means, solenoid means, said solenoid means communicating with camming means.

* * * * *